3,067,248
Patented Dec. 4, 1962

3,067,248
REFINING AROMATIC CARBOXYLIC ACIDS
Stanford J. Hetzel, Newtown Square, Pa., assignor to Sun Oil Company, Philadelphia, Pa., a corporation of New Jersey
No Drawing. Filed Dec. 6, 1957, Ser. No. 700,962
7 Claims. (Cl. 260—525)

This invention relates to refining colored monocyclic aromatic carboxylic acids produced in liquid phase partial oxidation of alkyl aromatic compounds.

In the liquid phase partial oxidation of alkyl aromatic compounds such as toluene, xylene, toluic acid, etc. a commonly used type of catalyst is one containing cobalt or manganese. Cobalt hydroxide, cobalt naphthenate, cobalt acetate, cobalt toluate, etc. and corresponding manganese compounds are catalysts of this type which have been employed.

In such oxidations, alkyl groups in the charge material are converted to carboxyl groups, and the carboxyl-containing products are usually filtered from the liquid oxidation medium. Materials containing the metal of the catalyst are frequently associated with the filtered solids and impart an undesirable color to the carboxylic acid products. It is difficult to remove the catalyst from the solid acids by conventional refining procedures. Prior means for avoiding the presence of metals in the final oxidation products are not feasible in every case, and in some instances are not sufficiently complete in their action.

According to the present invention, a novel manner is provided for removing metal-containing material from solid carboxylic acid products produced in liquid phase partial oxidation of alkyl aromatic compounds. This is accomplished by dissolving at least a portion of the solid carboxylic acid product in a suitable solvent, and contacting the resulting solution with an aliphatic dibasic carboxylic acid having 2 to 4 carbon atoms in the molecule. A precipitate is separated from the solution, which precipitate is believed to largely consist of cobalt or manganese salt of the aliphatic dibasic acid employed. This precipitate generally represents a very small fraction of the total material in the oxidation system, and its removal brings about a large improvement in the color of the solid carboxylic acid products. This precipitate can be discarded from the system. Alternatively it can be suitably processed for conversion of the aliphatic dibasic acid salt to the catalytic cobalt or manganese compound which is employed in the oxidation, the latter compound being recycled to the oxidation zone or employed in a subsequent separate oxidation of alkyl aromatic compounds.

The solution which is treated in the process according to the invention is obtained by dissolving aromatic carboxylic acid oxidation products in a solvent. Preferably, the solvent is capable of dissolving at 85° F. at least 0.1, more preferably 1.0, gram of the carboxylic acid product per 100 ml. of solvent. The solvent employed is also one in which the cobalt or manganese salt of the aliphatic dibasic acid employed has low solubility, e.g. is not soluble at 85° F. in amount greater than 0.01, preferably 0.001, gram of cobalt per 100 ml. of solvent.

Preferred solvents are ethers and alcohols having not more than 8 carbon atoms per molecule. Examples of suitable ethers are dimethyl ether, diethyl ether, diisobutyl ether, methyl isobutyl ether. Cyclic ethers containing ether oxygen atoms in a heterocyclic structure can also be employed such as dioxane-1,4, dioxane-1,3, butadiene dioxide, etc. Examples of suitable alcohols are methanol, isopropanol, n-butanol, hexanols, octanols, etc. Compounds containing both ether linkages and hydroxyl groups are also among the preferred solvents, e.g. methyl monoether of ethylene glycol, isopropyl monoether of tetramethylene glycol, etc. The solvent is usually, though not necessarily, employed in the presence of a small amount of water. The presence of large amounts of water is generally disadvantageous, however, in that it reduces the capacity of the solvent for dissolving aromatic carboxylic acids. The amount of water is usually within the approximate range from 0.5 to 15 weight percent of the water-solvent mixture.

Although ethers and alcohols are preferred solvents for use according to the invention, other solvents having the necessary characteristics previously set forth can also be employed. A person skilled in the art can in the light of the specification determine, by reference to these necessary characteristics, suitable solvents which can be employed.

The contacting of the aromatic carboxylic acids with the solvent to effect solution, and the contacting of the resulting solution with aliphatic dibasic acid are preferably carried out at a temperature within the approximate range from room temperature to 300° F. Relatively high temperatures facilitate the dissolving of the aromatic carboxylic acid in the solvent.

The process according to the invention can be applied to aromatic carboxylic acids produced by any of the well known liquid phase partial oxidations of alkyl aromatic compounds employing any of the well known cobalt or manganese oxidation catalysts. Generally the oxidation is performed at a temperature within the approximate range from 250° F. to 400° F.

The contacting of solution with aliphatic dibasic acid can be performed in any suitable manner. In one embodiment, the solution and the dibasic acid are agitated together to produce intimate dispersion of the dibasic acid in the solution. The mixture is then filtered to remove the solid products resulting from the reaction of cobalt or manganese compounds associated with the aromatic carboxylic acids with the aliphatic dibasic acid.

In another embodiment, a solid granular adsorbent material impregnated with an aqueous solution of the aliphatic dibasic acid is employed as an agent for the contacting of the aromatic carboxylic acids. The solution of the latter is for example precolated through a bed of such impregnated adsorbent. Any suitable known adsorbent can be employed, e.g. alumina, bauxite, silica gel, clay, charcoal, etc.

Examples of suitable aliphatic dibasic acids which can be employed according to the invention are oxalic, maleic, succinic, malonic and fumaric acids.

The following examples illustrate the invention:

*Example I*

A mixture of m-xylene and p-xylene is partially oxidized in liquid phase at a temperature of about 300° F. employing a cobalt naphthenate catalyst in amount to provide 0.05 weight percent of cobalt based on mixed xylenes. A carboxylic acid reaction product comprising about 60% isophthalic acid and 40% terephthalic acid is filtered, after dilution of the oxidation products with additional xylene, at room temperature. The filtered acids, weighing about 17 grams, are washed with additional xylene and then contacted at the boiling point of isopropanol with 178 cc. of isopropanol. The acids prior to contacting with isopropanol have a reddish color attributable to cobalt catalyst remaining in the filtered acids after washing with xylene. About 49% of the carboxylic acids dissolve in the isopropanol, the bulk of the acids which dissolve being isophthalic acid. The solution is filtered at room temperature from the undissolved acids, which constitute a terephthalic acid concentrate. The solution has a reddish coloration attributable to cobalt, the cobalt content being about 0.116 weight percent based on total solution.

0.2 gram of solid granular oxalic acid is added to the solution and the mixture is stirred at room temperature for about 5 minutes, then allowed to stand at room temperature for about 24 hours. A reddish purple material settles from the solution. The precipitated solid is filtered from the solution, leaving the latter with greatly decreased coloration as compared with the solution prior to contacting with oxalic acid. Isopropanol is evaporated from the solution to obtain as residue carboxylic acids which contain only about 0.01% cobalt based on the carboxylic acids. This example shows that nearly complete removal of cobalt from aromatic carboxylic acids is obtained in operation according to the invention, and that the undesirable color attributable to the cobalt can be largely eliminated.

*Example II*

Operation similar to that described in Example I is carried out, employing manganese naphthenates as oxidation catalyst in place of cobalt naphthenates. Generally similar results are obtained.

Generally similar results to those obtained in the preceding examples are obtained employing other solvents such as those disclosed previously and other aliphatic dibasic acids such as those disclosed previously.

The amount of aliphatic dibasic acid which is contacted with solution in the process according to the invention is preferably within the approximate range from 0.5 to 5 parts by weight of aliphatic dibasic acid per 100 parts of aromatic carboxylic acid in the solution, more preferably 1 to 3 parts by weight. Other amounts may be used in some cases, depending on the amount of metal to be removed.

The process of the invention is applicable both in cases where only a part of the aromatic carboxylic acid oxidation products are dissolved in a solvent, as in the preceding example, and also in cases where substantially all of such products are dissolved in a solvent. The invention is particularly beneficial as applied to isophthalic acid, which has relatively high solubility in alcohols and ethers for example, as compared with terephthalic acid. In the known alcohol separation of isophthalic acid from terephthalic acid, typical conditions involve temperatures in the range from room temperature to 300° F., alcohol to phthalic acids weight ratios in the range from 10:1 to 40:1, and water contents in the alcohol used in the range from 5 to 15 volume percent. Methanol, isopropanol or other lower alcohols can be employed. The isophthalic acid is selectively dissolved in the alcohol. Most of the color bodies go into the alcohol solution of isophthalic acid, rather than remaining in the undissolved terephthalic acid. On the other hand, upon subsequent precipitation and filtration of isophthalic acid from the alcohol solution, the color bodies largely remain with the filtered isophthalic acid. Accordingly, it is highly beneficial to remove color bodies such as cobalt-containing materials by contacting an alcohol solution of isophthalic acid with aliphatic dibasic acid, prior to separation of alcohol from isophthalic acid by known means such as distillation, filtration, etc.

It is also within the scope of the invention to dissolve both isophthalic acid and terephthalic acid in a solvent, and contact the solution with an aliphatic dibasic acid. Generally, greater amounts of solvent, lower water contents in the solvent, higher temperatures, or some other condition favoring solubility are used in this embodiment than in the embodiment where selective dissolving of isophthalic acid is involved. In the light of the present specification, a person skilled in the art can select suitable conditions for bringing about the dissolving of terephthalic acid as well as of isophthalic acid.

The invention claimed is:

1. Process for refining colored monocyclic aromatic carboxylic acids containing compounds of a metal selected from the group consisting of cobalt and manganese; said acids being selected from the group consisting of benzoic, toluic, and phthalic acids, which comprises the steps of:
   (a) dissolving said acid in a solvent selected from the group consisting of alcohol and ether containing no more than 8 carbon atoms per molecule to form a solution;
   (b) contacting said solution with dibasic carboxylic acid having 2 to 4 carbon atoms per molecule to form a precipitate containing compounds of said metal;
   (c) separating said solution and said precipitate; and
   (d) recovering said monocyclic aromatic acid with an improved color.

2. Process according to claim 1 wherein said solution, prior to said contacting, is formed by contacting a mixture of isophthalic acid and terephthalic acid, previously produced by partial oxidation of m-xylene and p-xylene and containing compounds of said metal, with an alcohol having not more than 8 carbon atoms per molecule, thereby to selectively dissolve isophthalic acid and form said solution.

3. Process according to claim 1 wherein the dibasic acid is oxalic acid, and the metal is cobalt.

4. Process according to claim 1 wherein said carboxylic acid products comprise dibasic aromatic acids.

5. Process according to claim 1 wherein said contacting is performed at a temperature in the approximate range from room temperature to 300° F.

6. Process according to claim 1 wherein said solution is a solution of carboxylic acid products in an alcohol having not more than 8 carbon atoms per molecule.

7. Process according to claim 1 wherein said solution is a solution of carboxylic acid products in an ether having not more than 8 carbon atoms per molecule.

References Cited in the file of this patent

UNITED STATES PATENTS

| | | |
|---|---|---|
| 995,041 | Strauss | June 13, 1911 |
| 2,002,342 | Enderli | May 21, 1935 |
| 2,680,757 | Himel | June 8, 1954 |
| 2,741,633 | McKinnis et al. | Apr. 10, 1956 |

OTHER REFERENCES

O. Hauser et al.: Journal Prokt. Chem., vol. 79, pages 358–68, II Series.

Winkelblich: Liebig's Annalen, vol. 13, page 273.